J. H. DOLBY.
TIMING ATTACHMENT FOR CAMERAS.
APPLICATION FILED DEC. 17, 1909.
977,440.
Patented Dec. 6, 1910.
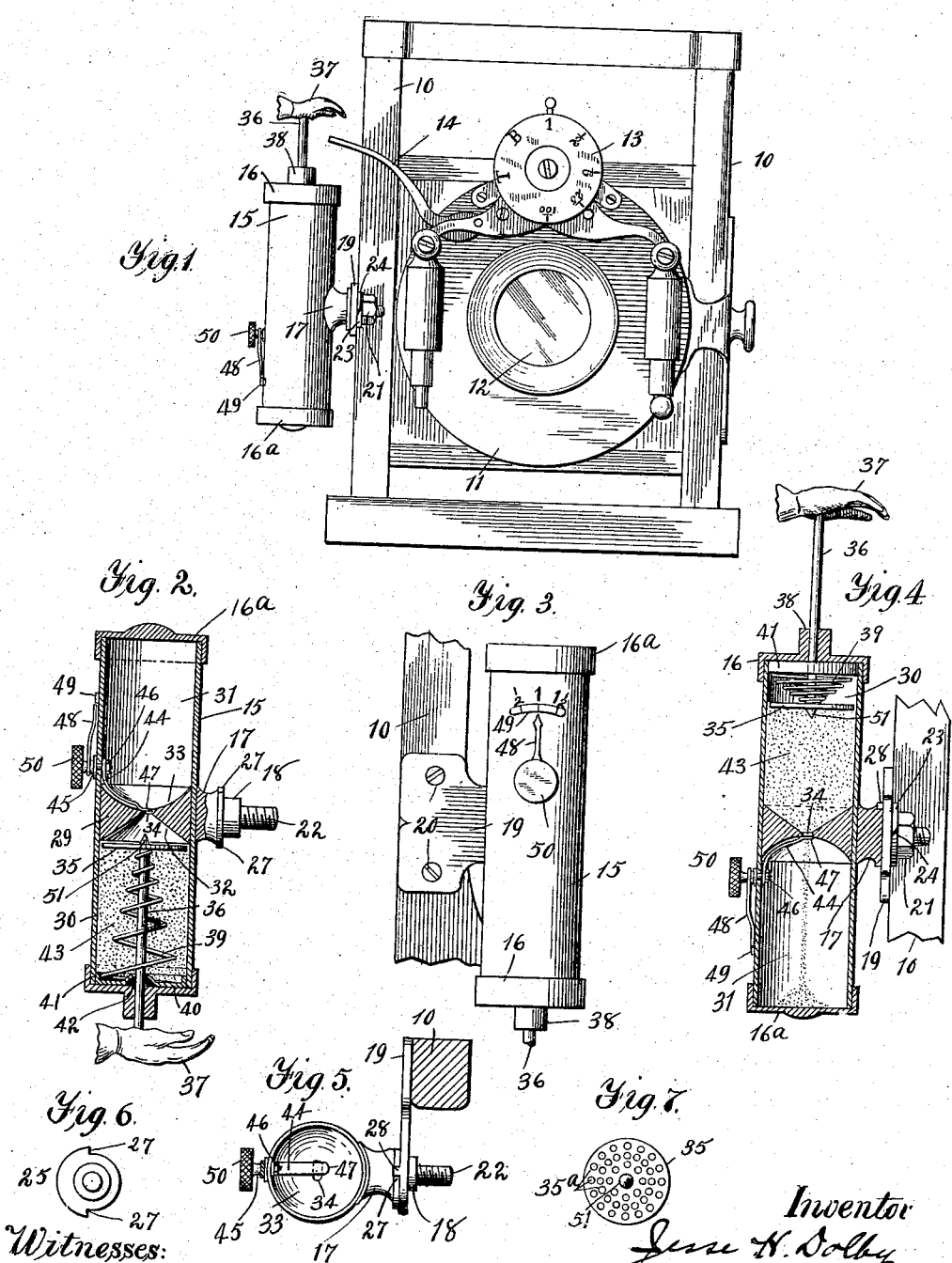

UNITED STATES PATENT OFFICE.

JESSE H. DOLBY, OF ELGIN, ILLINOIS.

TIMING ATTACHMENT FOR CAMERAS.

977,440.  Specification of Letters Patent.  Patented Dec. 6, 1910.

Application filed December 17, 1909. Serial No. 533,536.

*To all whom it may concern:*

Be it known that I, JESSE H. DOLBY, subject of the King of Great Britain, residing at Elgin, in the county of Kane and State of Illinois, have invented certain new and useful Improvements in Timing Attachments for Cameras, of which the following is a specification.

My invention relates to photographic apparatus and refers especially to shutter releasing devices for cameras.

The chief objects of the improvements which constitute the subject matter of this application for patent are as follows:—to arrange a shutter tripping device having a retarded movement so that a predetermined period of time will elapse between the setting of the device and the tripping action, and to furnish means for governing the movement in order that the timing may be varied within certain limits. With such an attachment the operator will have sufficient time after setting the release mechanism to get into position before the camera and assume a desirable pose before the shutter release is tripped, so that he may take his own photograph without the aid of an assistant, the timing mechanism allowing a range of time from a small fraction of a minute to one extending over a number of minutes.

Further objects of the invention are to produce a compact and smoothly working device for the purpose stated that can be attached directly to the camera, being especially adapted for use with automatic time exposure, as well as snap shot cameras, and as the mechanism has a moderate and uniform movement and the checking means moves with an even flow and noiselessly there will be no perceptible vibration or jar during any part of the release movement thus rendering the device useful where secrecy is desired, and making it particularly advantageous in detective work.

Another advantage will be found in the opportunity afforded to use both hands in holding the camera rigid while the automatic tripper is operating the usual finger release, and as the device is very compact the weight added to the camera will be so slight, as to interfere in no way with the accurate working of the instrument.

Another advantage is to be noted in the arrangement of the releasing device which allows it to be placed in an inoperative position so that it will not interfere with the operation of the shutter release lever so that the latter may be operated by the finger in the ordinary way.

I accomplish the desired results by means of the device illustrated in the accompanying drawing, which forms a part of this application, the important details of construction being disclosed in the following views:—

Figure 1 is a front elevation of a camera equipped with a finger release, and having my improved automatic tripping device attached thereto and shown in operative position, the remaining views showing details of construction of the tripping device on an enlarged scale. Fig. 2 is a vertical median section of the cylinder removed from its bracket; Fig. 3 is a side elevation of the device, showing means for attachment to the camera; Fig. 4 is a vertical median section, showing the device in operative position and attached to its bracket; Fig. 5 is a plan view of the device as shown in Fig. 2, but with the end cap of the cylinder removed to disclose the timing valve, and with the addition of the bracket and support; Fig. 6 is an end view of the cylinder trunnion and threaded stem, and Fig. 7 is a bottom plan view of the perforated piston head.

Referring to the details of the drawing (Fig. 1) the numeral 10 indicates the rectangular slidable frame of a camera, bearing a lens plate 11 supporting a lens 12 and equipped with the usual attachments relating to the operation of the shutter (not shown). These attachments being in common use and well understood in the art will not be described except so far as they are closely related to my improvements. Immediately above the lens 12 is located the usual speed regulating dial 13, and projecting laterally from the lens plate 11 is a finger release lever 14 of the type in ordinary use and connected to the shutter releasing mechanism in the common manner. My improved attachment is shown at the left hand side of the said figure, and consists of a cylindrical receptacle 15, closed at the opposite ends by removable caps 16, 16ª, which may be threaded or adapted to frictionally engage the body of the cylinder as preferred. The said cylinder is supported upon one side only by a projection 17 having a reduced bearing portion or trunnion 18 which engages a suitable opening in a bracket plate 19 attached by screws 20 to one of the frame members 10. The trunnion is secured in the bracket plate by a nut 21 which engages a threaded stem 22 projecting axially from the said trunnion 18. The latter is of sufficient length to project slightly through the said plate 19, and upon the projecting portion is mounted a spring washer 23, having an opening 24 upon one side to add to its resiliency. By the use of this spring washer, the cylinder will be frictionally held in any position to which it may be turned upon its pivot or trunnion 18. There are two positions for the cylinder 15, both vertical, in one of which it must always be placed—an operative position shown in Figs. 1 and 4, and a reversed or inoperative position, illustrated in Figs. 2 and 3. In order to facilitate the rapid and accurate placing of the cylinder in either of these positions a stop mechanism is provided. This consists of an annular collar or flange 25, formed integral with the projection 17, and having a portion of its periphery cut away to form shoulders 27, which are engaged by a lug 28 projecting from the bracket plate 19 (see Figs. 5 and 6) when the cylinder is turned in either direction.

The interior of the cylinder 15 is divided by a partition 29 into two approximately equal chambers, an upper or working chamber 30 and a lower or reserve chamber 31. The partition 29 is of considerable thickness compared to its diameter and is furnished with depressions 32, 33, upon its opposite sides. The depression 32 upon the upper side is conical in shape, while the lower depression 33 is concave. The bottoms of these depressions nearly meet in the median plane of the partition and are connected by a passage in the form of a slot 34. Within the upper or working chamber is arranged a piston or plunger comprising a disk-shaped head 35 furnished with numerous perforations 35ª and provided with a stem or rod 36, which extends through a central hole in the upper cap 16 and is provided at the outer end with a transverse trip or hand 37, which is arranged so that it will engage the end of the finger release lever 14 which projects into the path of the said hand when the cylinder is in operative position, and is operated by means hereinafter described. The cap 16 is provided with a central projection or boss 38, through which the rod of the piston passes, and this boss projects sufficiently from the cap to form a long bearing for said rod and prevent lateral play, this arrangement being especially necessary since the disk-shaped piston head is of less diameter than the cylinder chamber within which it works, and is entirely free from the walls of the cylinder and is unsupported thereby so that the said boss 38 forms the only bearing point for the piston and rod.

The piston is actuated in one direction by a coiled spring 39, arranged in a conical spiral surrounding the piston rod 36. The apex of the spiral engages the piston head 35 while the base coils rest against a circular plate 40 having a central aperture through which the piston rod passes and provided with a marginal spring retaining flange 41. The center of the disk is struck up to form a cup or depression surrounding the rod and in this cup is placed a suitable packing or gasket 42. It will be evident that when the cylinder is in the operative position shown in Fig. 1, the rod 36 may be extended sufficiently to bring the operating hand 37 above the end of the finger release lever 14, thus compressing the spring 39 in the manner shown in Fig. 4. If the piston is now released the recoil of the spring will carry the piston back to its initial position and in this movement the trip or hand 37 will engage the said finger release 14 and operate the lens shutter. It will be perceived that this action of the spring 39 would be so rapid as to defeat the purpose of the automatic release unless some provision were made to check or hinder the action of the spring. I accomplish this retarding result by employing a granular substance 43 which is placed in sufficient quantity within the chamber to materially interfere with the progress of the piston in its reciprocating movement. Any finely divided material that will flow freely may be employed to produce this inhibitory effect. I use for this purpose a fine grade of sifted sea sand, which has the property of producing a uniform flow through a comparatively narrow orifice. It is evident that a liquid or other fluid may be effectively substituted for the granular material, but, owing to the necessity of making the fittings with more care to prevent leakage and for other reasons, clean sand is preferred. For the purpose of varying the flow of the material through the slot 34, the latter is provided with a valve arranged in the reserve chamber 31. This consists of an arm 44 attached to a shouldered pivot 45, which passes through the wall of the cylinder, a nut 46 retaining the arm in position. The said arm is curved to correspond with the concave depression upon that side of the partitions, and its extremity 47 is adapted to overlie the slot 34 which forms a passage between the two chambers. The width of the end 47 is less than the length of the slot so that the valve thus formed cannot completely close the opening. Fixed to the body of the said screw 45, externally to the cylinder wall is a pointer or index hand 48, and arranged adjacent this index is a scale 49, having figures indicating minutes marked thereon. It will be understood that the position of the hand or index 48 corresponds with that of the valve 47 so that the relation of the latter to the slot 34, or the degree of closure, may be determined by turning the screw by means of a milled head 50.

The operation of my improved automatic shutter release is as follows:—The normal position of the cylinder is that shown in Figs. 2 and 3, which is also its inoperative position, and after being used to trip the finger release the device must be turned back to this position and allowed to remain there for a sufficient time to permit the sand to gravitate to the working chamber, which will be the lower one for the time being. Supposing the cylinder is in the said normal position shown in Fig. 2, with the sand all in the working chamber, if it is desired to operate the shutter release by means of the device, the first step will be to set the speed regulating dial 13 to the time exposure desired, and then turn the milled head 50 until the index hand 48 points to the time selected for posing. The cylinder is then turned to a nearly vertical position, and the piston raised by making firm traction upon the rod, the hand or trip 37 affording a convenient grip for the fingers of the operator. This elevation of the piston to compress the spring meets with comparatively little opposition from the sand since the latter will pass readily through the perforations 35a and the annular space between the piston 35 and the wall of the cylinder. When the piston has been raised to its limit, the cylinder is turned to the vertical position and the piston rod released. The action of the spring 39, which is in approximately the position shown in Fig. 4, will carry the piston downward, pressing it upon the sand while the latter will retard the piston movement at the same time flowing in a steady stream through the orifice 34 into the reserve chamber which is now below, the rate of flow depending more upon the relative size of the said orifice than the pressure of the piston, the latter having no appreciable effect upon the flow. The piston, thus urged by the spring, will continue to descend to the limit of its stroke and the parts are so arranged that as it moves downward the trip or hand 37 will engage the finger release lever 14, near the end of its travel and thus the desired effect upon the shutter will have been sufficiently delayed to permit the operator to assume a pose before the lens. When the piston has thus been carried to the bottom of the working chamber by the action of the spring, the sand will all be in the reserve chamber 31, and to retire the sand to the working chamber 30, the cylinder must be reversed and allowed to remain in its inoperative position until the charge of sand has flowed back through the aperture 34 passing through and around the piston head, until it occupies the space below the said head as shown in Fig. 2, the flow of the sand through the perforations 35a being facilitated by giving the end 51 of the piston rod, after it has passed through the piston, a conical form to aid in spreading the sand evenly over the perforated head.

Having thus described my invention what I claim as new, is:—

1. In a shutter release tripping device, the combination of a receptacle comprising two communicating chambers, a loosely fitting member arranged to reciprocate in one of said chambers and adapted to engage the shutter release, and a material in the receptacle adapted to gravitate between the said member and the walls of the chamber and through the communication between the chambers.

2. In a shutter release tripping device, the combination of a receptacle adapted to be attached to a support, a partition dividing the receptacle into two chambers, a passage connecting the chambers, a perforated piston arranged in one of said chambers and adapted to engage the shutter release lever, and a material in the receptacle adapted to flow by gravity through the perforations in the piston and the said passage.

3. In a shutter release tripping device, the combination of a pivoted receptacle adapted to be attached to a camera, a partition dividing the receptacle into two chambers, a passage connecting the chambers, a valve controlling said passage, a piston arranged in one of said chambers and adapted to operate the shutter release, and a material in the receptacle adapted to flow by gravity through the said passage.

4. In a camera, a shutter release tripping device consisting of a pivoted receptacle having two communicating chambers, a valve controlling the passage between said chambers, an indicator for the valve, a piston arranged in one of said chambers and adapted to operate the shutter release, means for operating the piston, and means for retarding the piston movement in one direction.

5. In a camera, a shutter release tripping device, consisting of a cylinder pivotally mounted and having two communicating chambers, a piston arranged in one of said chambers, and adapted to operate the shutter release, means for operating the piston, and means for retarding the piston movement in one direction.

6. In a camera, a shutter release tripping device, comprising a cylinder, a partition dividing the interior of the cylinder into two chambers, and provided with an aperture, a piston arranged in one of said chambers and adapted to operate the shutter release, means for operating the piston, and means for retarding the piston movement in one direction, said means consisting of a material in the cylinder adapted to flow by gravity through said aperture.

7. In a camera, a shutter release tripping device, comprising a cylinder pivotally mounted, a partition in the cylinder provided with an aperture, a piston arranged in the cylinder, a spring for the piston, and means for retarding the piston movement in one direction, said means consisting of a material adapted to flow by gravity through said aperture.

8. In a camera, a shutter release tripping device, consisting of a cylinder pivotally mounted, a partition dividing the interior of the cylinder into two chambers and provided with an aperture, a valve controlling said aperture, a perforated piston arranged in one of said chambers, means for operating said piston, and means for retarding the piston movement in one direction said retarding means consisting of a granular material adapted to flow through said aperture.

9. In a camera, a shutter release device consisting of a cylinder pivotally mounted, and having two communicating chambers, a valve controlling the passage between said chambers, means for operating the valve, a piston arranged in one of said chambers, a piston rod extending externally to the cylinder and adapted to operate the shutter release, means for operating the piston, and a granular substance in the cylinder adapted to retard the piston movement in one direction.

10. In a camera, a shutter release tripping device, consisting of a cylinder pivotally mounted and having two communicating chambers, a valve controlling the passage between said chambers, means for operating the valve, an indicator for said valve, a perforated piston arranged in one of said chambers, a piston rod extending externally to the cylinder and adapted to operate the shutter release, a spring for the piston, and a granular material in the cylinder adapted to flow by gravity through the passage between the chambers.

In testimony whereof I affix my signature in the presence of two witnesses.

JESSE H. DOLBY.

Witnesses:
CHAS. F. BASSETT,
M. A. MILORD.